Patented June 22, 1926.

1,589,672

UNITED STATES PATENT OFFICE.

WALTER W. WILLISON, OF BROOKLYN, NEW YORK, ASSIGNOR TO THERMOKEPT CORPORATION, OF NEW YORK, N. Y., A CORPORATION OF DELAWARE.

METHOD OF PREPARING RICE FOR CANNING.

No Drawing. Application filed September 6, 1924. Serial No. 736,375.

This invention relates to the preparation and treatment of rice and other cereals which are prepared and canned ready for use.

Many attempts have been made to properly prepare and seal cereals in containers ready for use. Where rice is thus prepared and canned special difficulties present themselves. In the first place, rice cooked and canned in accordance with known methods has a tendency to form a starchy mass in the can wherein it is sealed. This is highly undesirable and militates against a ready sale and extensive use. Then again, it is found that rice when cooked and sealed in tinned containers will develop a black or brownish streak or stain which is likewise very undesirable. This discoloration is believed to be due to the alkalinity of the rice acting on the metal and causing oxidation. I have discovered a mode of treatment whereby the above undesirable features are overcome and completely counteracted, so that no discoloration appears and the individual kernels of the rice or other cereal stand out by themselves in their characteristic individuality. The mode of treatment is applicable to any cereal and is especially applicable to those cereals having an alkaline reaction, such as rice, pearl barley and others.

Where rice is the commodity to be treated, the same is washed with cold water to remove excess starch and substances used in polishing the rice. The washed rice is then put into boiling water which contains a small proportion of acid such as phosphoric or other acid, and boiled about 20 minutes. The amount of acid used is slightly in excess of the amount necessary to neutralize the alkalinity of the rice and the water used. In other words, the rice is boiled or blanched in acid water. As soon as the grains have swelled to the maximum size, the cooking is stopped, the boiling water is removed and the rice washed in cold water to remove free starch and excess of acid. The cold water is drained off and the rice is covered with a salt solution. The amount of salt used varies, and is about three ounces to a gallon of water. The salt solution is allowed to remain on the rice for a few minutes or until no bubbles arise. It is then drawn off and can be used again. The prepared rice is now put into cans and sealed in a vacuum. The cans are thereafter sterilized and labeled.

Rice thus prepared and canned retains its individuality and is ready for being served, or it may be used as a basis of many other products well known to the culinary art.

Having now described my invention, what I claim as new and useful, of my own invention, and desire to secure by Letters Patent is:

1. The method of preparing a commodity of food as rice for canning, which comprises blanching or boiling said commodity in acidulated water until neutralized and said commodity is distended to its maximum capacity, then arresting said blanching and cooking steps and immersing said commodity in a saline solution, and then removing said solution and canning the commodity in vacuo.

2. The method of preparing a commodity of food as rice for canning, which comprises washing said commodity in cold water, then boiling said washed commodity in acidulated water, then arresting said boiling and supplying a saline solution to a point of saturation, and finally removing excess of saline solution and canning said commodity in vacuo.

3. The method of preparing a commodity of food as rice for canning, which comprises blanching or boiling said commodity in acidulated water until neutralized and said commodity is distended to its maximum capacity, then arresting said blanching and cooking steps and immersing said commodity in a saline solution, removing said solution and canning the commodity in vacuo, and sterilizing.

4. The method of preparing rice for canning, which comprises blanching said rice in acidulated water to counteract its alkalinity, then arresting said blanching step and immersing the rice in a saline solution, removing said saline solution and sealing the rice in vacuo.

5. The method of preparing rice for canning, which comprises blanching said rice in acidulated water to counteract its alkalinity, then arresting said blanching step and removing the acidulated water by washing in cold water, then immersing in a saline solution and finally removing said saline solution and canning in a vacuum and finally sterilizing said canned rice.

6. The method of preventing the formation of discoloration in canned goods as rice which includes the step of neutralizing the alkalinity of the said goods to be canned and then canning said goods.

7. The method of preventing the formation of discoloration in canned rice which includes the step of rendering slightly acid the rice to be canned, then counteracting any excess of acid and canning said rice in vacuo.

In testimony whereof I have hereunto set my hand on this 4th day of September, A. D. 1924.

WALTER W. WILLISON.